Sept. 27, 1966   A. VISCHER, JR   3,275,457

FROZEN FOOD PRODUCT AND PACKAGE

Filed April 17, 1962

INVENTOR.
Alfred Vischer, Jr.
BY
Fidler, Beardsley & Bradley
ATTORNEYS

United States Patent Office 3,275,457
Patented Sept. 27, 1966

3,275,457
FROZEN FOOD PRODUCT AND PACKAGE
Alfred Vischer, Jr., 909 S. Cumberland Ave.,
Park Ridge, Ill.
Filed Apr. 17, 1962, Ser. No. 188,096
7 Claims. (Cl. 99—192)

The present invention relates to the processing and packaging of foods and it has for an object the provision of a new and improved process for packaging, in the frozen state, normally liquid foods, such as soup and the like. It has for a further object a new and improved package of frozen soup or other substantially liquid or viscous food product.

For many years frozen foods have been on the market for use in the home, in restaurants, and in various institutions. The freezing and later reconstituting process is least destructive of nutrient values, as well as of taste and texture of foods than other preserving processes, and as a result, the use of frozen foods has reached staggering proportions. It is significant to note, however, that in spite of the large volume of frozen foods which are merchandised, soups are but rarely sold in the frozen state. And this is true even though one very desirable feature of frozen foods is that the food can be prepared and precooked by master chefs to the "Queen's taste," and of all food items soup is one which demands the most delicacy in seasoning and general makeup. Nevertheless, even though the advantage of perfection in composition is most desirable in soup, and even though such perfection can be best achieved in a frozen product, soup does not sell to any great extent in the frozen state, simply because of the length of time required to thaw it.

Soup, being substantially liquid, becomes a solid block or chunk of ice when frozen, and thus requires a great deal of heat and, therefore, time in order to melt or thaw. Consequently, even though the quality of frozen soup may exceed that of soups preserved in other ways, the excessive time required to heat and serve frozen soup has prevented its widespread use. This is also true of other substantially liquid food products such as gravies and sauces. Of course, heat may be applied to the froezn food item, but this results in overcooking the outer portions of the item which normally are the first to melt. Hence, the advantage of precise seasoning and cooking are lost.

Therefore, it is an object of the present invention to provide a new and improved process for freezing soup or other normally liquid or viscous food products so as to appreciably reduce the time required to thaw and to heat it to the serving temperature without overcooking.

Another object of the present invention is to provide a new and improved package of frozen soup or other normally liquid and viscous food.

Briefly, the above and further objects are realized in accordance with the present invention by freezing the normally liquid food item in the shape of thin wafers having a very high surface area-to-volume ratio. Moreover, in order to facilitate the transmission of heat to the individual frozen units, each wafer may be provided with surface irregularities and perforations to provide passageways across the faces and through adjacent wafers in a stack. In one embodiment of the invention, the wafers are provided with parallel grooves on the faces thereof to provide the said irregularities and also to appreciably increase the surface area-to-volume ratio of each wafer.

Further objects and advantages and a better understanding of the present invention may be had by reference to the following detailed description taken in connection with the accompanying drawing in which.

Although the present invention is applicable for use with most liquid and viscous food products, it is described herein in connection with soup. It will be understood, however, that there is no intent to thus limit the scope of protection to soup.

Figure 1:
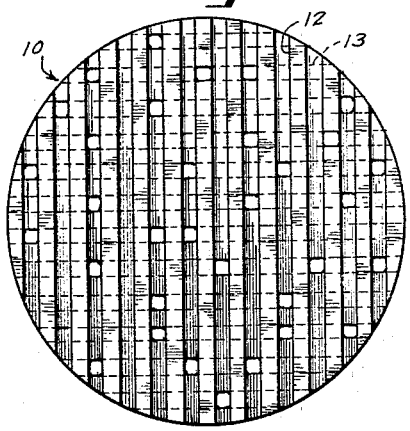
FIG. 1 is a top view of a wafer of frozen soup embodying the present invention.
Figure 2:
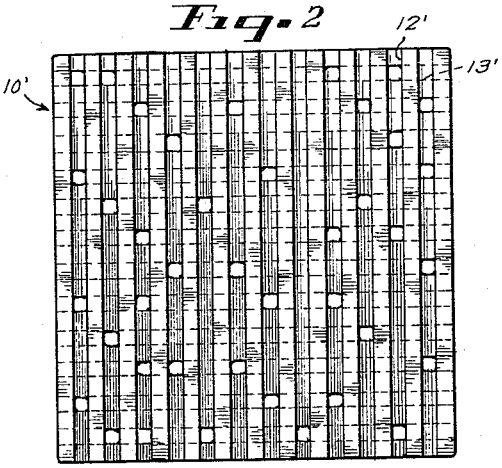
FIG. 2 is another wafer of frozen soup embodying the present invention.

Referring now to the drawings and particularly to FIG. 1 thereof, there is shown a thin circular wafer 10 which is a frozen portion of soup or other liquid or viscous food product including a partially dehydrated concentrate suitably formed in a mold (not shown). FIG. 2 illustrates a similar wafer 10' which is generally rectangular in shape. Other peripheral shapes may be used. Because of the fact that the frozen soup wafers 10 and 10' are very thin, the surface area-to-volume ratio is great, and the time required for heat to penetrate the soup and thaw it out is greatly reduced.

By way of example, the wafer 10 may have a diameter of six inches and a thickness of one-quarter inch or less. The wafer 10' may be of similar size.

In order further to reduce the thawing time, the wafer 10 is provided with a plurality of flutes or grooves 12 extending in a parallel direction across one surface thereof. A similar set of flutes 13 extend parallel to one another on the opposite side of the wafer in directions perpendicular to the flutes 12. Similar flutes 12' and 13' are provided on the opposite faces of the wafer 10'. Under some circumstances it may be desirable to run the flutes on both sides of the wafer parallel to one another. These flutes perform two important functions. Firstly, they substantially increase the surface area-to-volume ratio of the wafer, and secondly they provide passageways between adjacent wafers in a stack, to facilitate transmission of a heating fluid across the faces of the wafers. By making the depths of the grooves equal to or slightly greater than one-half the thickness of the wafer, where the flutes cross they leave a very thin section or a perforation for the circulation of hot air or steam or other heating fluids through a stack of like wafers.

Figure 3:
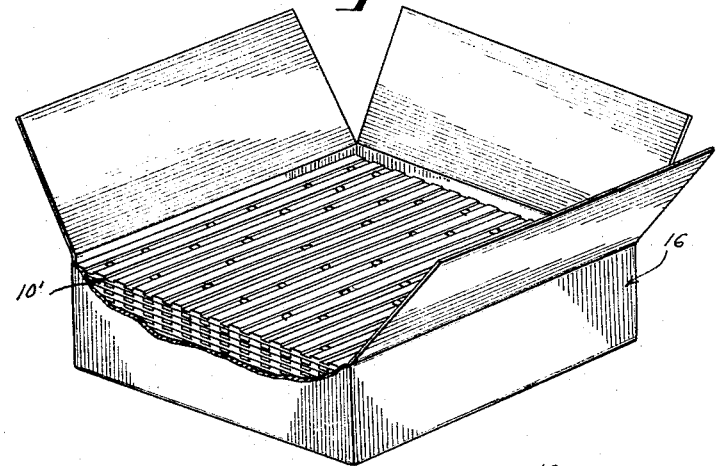
FIG. 3 is a package, partly broken away, of soup packaged in accordance with the teachings of the present invention.

In order to store and merchandise soup frozen in the wafer form, a plurality of the wafers are preferably packaged in a single container. For example, as shown in FIG. 3, a carton 16 is shown wherein a plurality of rectangular wafers 10' are arranged in face-to-face relationship, one above the other.

When it is desired to prepare the soup for serving, a suitable number of the frozen wafers 10' may be removed from the carton 16 and heated by any suitable means, such as, for example, as by stacking them in a heated double boiler or other cooking vessel. Moreover, if extremely fast thawing and heating is desired, the wafers 10' may be placed in a pressure cooker of either the domestic or institutional type.

Although the carton 16 may be constructed so as to permit heating of the wafers directly therein, it is usually better to use a separate container for this purpose since heat transfer to the wafers can be better achieved.

Figure 4:
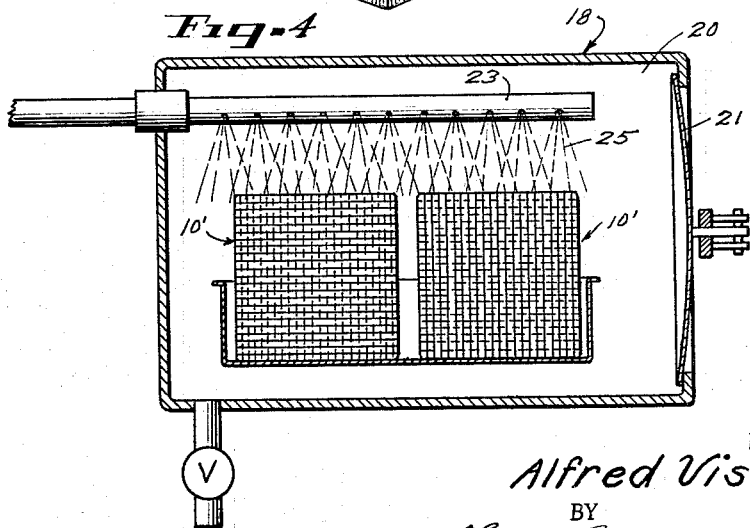
FIG. 4 is a side elevational view of a cooking unit in which soup packaged in accordance with the present invention is being thawed and heated.

In FIG. 4 there is shown a pressure cooker 18 of the type particularly described in a copending application, Serial No. 677,432, filed August 12, 1957. As shown, the cooker 18 comprises a pressurized chamber 20 having a removable closure 21 over an access opening therein and having a steam conduit 23 extending therein from which a plurality of jets of steam 25 are directed down into and onto a pan 27. As shown, a plurality of the wafers 10' are stacked side by side in vertical planes with the flutes on adjacent wafer surfaces extending in opposite directions, thereby to provide crossed passageways for the transmission of steam across the faces of the soup wafers 10′. In this way, rapid thawing of the soup is achieved. Although the wafers 10′ are illustrated as lying in vertical planes, it will be understood that they may be arranged horizontally or in planes transverse to both the vertical and horizontal planes.

Another feature of the invention is to thaw frozen, normally liquid or viscous concentrates which can be melted into a measured pan of water. This method would reduce the cost of transportation by conserving both space and weight and so compete with the dehydrated soups that are so popular today.

Where the food item to be frozen and packaged is a more or less pure liquid, such, for example, as a meat broth or gravy, the wafer dimensions are dictated by optimum heat transfer and reasonableness of size. Many soups and other substantially liquid foods, however, include small solid substances. In such cases, the minimum volume of the wafers between adjacent flutes must be large enough to accommodate such solids. Where the solids are too large to fit in these spaces irregularly spaced flutes may be employed to provide a few larger sized areas where such solids can be located.

While the present invention has been described in connection with a particular embodiment thereof, it will be understood that those skilled in the art may make many changes and modifications without departing from the true spirit and scope of the invention. Therefore, it is intended by the appended claims to cover all such changes and modifications as come within the true spirit and scope of the present invention.

I claim:
1. A food product of a type which is at least partially liquid at normal room temperature, comprising a thin, frozen wafer of said food product, said wafer being provided with parallel grooves on opposite faces thereof, the grooves on one face extending transversely to the grooves on the opposite face, said grooves having a depth substantially equal to one-half the total thickness of said wafer.

2. An article of manufacture, comprising
a thin wafer or frozen liquid food,
a plurality of rectilinear grooves arranged in parallel, side-by-side relationship on at least one face of said wafer,
said wafer having a plurality of apertures extending from one face thereof to the other.

3. An article according to claim 2 wherein said apertures open into said grooves.

4. A wafer or frozen liquid food having a plurality of rectilinear grooves arranged in parallel, side-by-side relationship in one face thereof and a plurality of rectilinear grooves arranged in parallel, side-by-side relationship in the opposite face of said wafer, said grooves having a depth approximately equal to one-half the thickness of said wafer and opening onto the edges of the wafer.

5. A wafer according to claim 4 wherein said liquid is meat broth and said wafer has a thickness of about one-quarter inch.

6. A package of frozen liquid food, comprising
a plurality of flat wafers of the frozen liquid food,
said wafers being arranged in a stack in face-to-face relationship,
said wafers having surface irregularities on the faces thereof providing channels extending between adjacent wafers,
said wafers each having a plurality of apertures extending therethrough, and
a wrapper enclosing said stack of wafers.

7. Frozen liquid food, comprising
a plurality of substantially flat, thin wafers of frozen liquid food arranged in a stack in face-to-face relationship,
the faces of said wafers having irregularities therein providing channels extending between adjacent wafers and opening at the edges of said stack,
whereby a heating fluid applied to said stack may pass through said channels into the interior of said stack.

References Cited by the Examiner

UNITED STATES PATENTS

| | | | |
|---|---|---|---|
| 1,896,529 | 2/1933 | Tressler et al. | 99—192 |
| 2,015,496 | 9/1935 | Platt | 99—192 |
| 2,507,862 | 5/1950 | Mead. | |
| 3,114,643 | 12/1963 | Boston et al. | 99—171 |

OTHER REFERENCES

Betty Crocker's Picture Cook Book, second edition, 1956, page 408, published by McGraw-Hill Book Co., Inc., New York.

A. LOUIS MONACELL, *Primary Examiner.*

ABRAHAM H. WINKELSTEIN, R. N. JONES,
*Assistant Examiners.*